US009949459B2

(12) United States Patent
Pattie et al.

(10) Patent No.: US 9,949,459 B2
(45) Date of Patent: Apr. 24, 2018

(54) RESTRAINING DEVICE

(71) Applicant: SALLY PATTIE CONSULTING LIMITED, Graffham, West Sussex (GB)

(72) Inventors: Sally Pattie, Graffham (GB); Simon Collings, London (GB)

( * ) Notice: Subject to any disclaimer, the term of this patent is extended or adjusted under 35 U.S.C. 154(b) by 0 days.

(21) Appl. No.: 14/350,344

(22) PCT Filed: Oct. 8, 2012

(86) PCT No.: PCT/GB2012/052496
§ 371 (c)(1),
(2) Date: Apr. 7, 2014

(87) PCT Pub. No.: WO2013/050793
PCT Pub. Date: Apr. 11, 2013

(65) Prior Publication Data

US 2015/0020751 A1 Jan. 22, 2015

(30) Foreign Application Priority Data

Oct. 7, 2011 (GB) .................................. 1117342.4
Feb. 6, 2012 (GB) .................................. 1202010.3

(51) Int. Cl.
*A01K 27/00* (2006.01)
*A47D 13/08* (2006.01)

(52) U.S. Cl.
CPC .......... *A01K 27/004* (2013.01); *A01K 27/001* (2013.01); *A47D 13/086* (2013.01)

(58) Field of Classification Search
CPC ........................... A01K 27/001; A01K 27/004
USPC .............. 242/548, 566, 615.21, 615.8, 615.4
See application file for complete search history.

(56) References Cited

U.S. PATENT DOCUMENTS 4,328,767 A * 5/1982 Peterson .............. A01K 27/004 119/794
4,964,370 A * 10/1990 Peterson .............. A01K 27/004 119/794
6,205,956 B1 3/2001 Dickie et al.
7,168,393 B2 * 1/2007 Bogdahn .............. A01K 27/004 119/796
D573,314 S * 7/2008 Plewa .......................... D30/153
D670,871 S * 11/2012 Desberg ....................... D30/153
2009/0255486 A1 * 10/2009 Thompson ........... A01K 27/006 119/794

(Continued)

FOREIGN PATENT DOCUMENTS

FR 1519817 A * 4/1968 ........... A01K 27/004

OTHER PUBLICATIONS

International Search Reprot and Written Opinion in corresponding International Application No. PCT/GB2012/052496, International dated Oct. 8, 2012.

(Continued)

*Primary Examiner* — Monica L Williams
*Assistant Examiner* — Aaron M Rodziwicz
(74) *Attorney, Agent, or Firm* — Jensen & Puntigam, PS

(57) ABSTRACT

An improved restraining device may include a retractable strap lead, a housing in which the retractable strap lead is at least partially housed, and a twister for changing the orientation of the retractable strap so that, in use, the orientation of the strap is changed as it is deployed from the housing.

15 Claims, 11 Drawing Sheets

13a'
13a
12
13
11
4
13c
13b
13b'

(56) References Cited

U.S. PATENT DOCUMENTS

2011/0174238 A1 7/2011 Dagnon
2011/0308480 A1* 12/2011 San Sebastian Mendizabal ............................ A01K 27/004 119/794

OTHER PUBLICATIONS

European Patent Office, Communication pursuant to Article 94(3) EPC for counterpart European Application No. 12781410.1-1665, dated Mar. 6, 2017.

* cited by examiner

RESTRAINING DEVICE

CROSS REFERENCE TO RELATED APPLICATIONS

This application claims priority to PCT International Application No. PCT/GB2012/052496, having an international filing date of Oct. 8, 2012, and entitled Restraining Device, which in turn claims priority to Great Britain Application No. 1117342.4, filed on Oct. 7, 2011, as well as Great Britain Application No. 1202010.3, filed on Feb. 6, 2012. All of the foregoing applications are herein expressly incorporated by reference, in their entirety.

BACKGROUND OF THE INVENTION

This invention relates generally to restraining devices for animals or beings, for example dogs or humans. More specifically, although not exclusively, this invention relates to collars or harnesses for pet animals or children that also contain retractable leads.

Collars are often placed around an animal's neck so that an identity tag may be attached to the animal. Collars and harnesses are also used for attaching leads or leashes to the animal, for example so that the animal can be kept with the owner when outside. Harnesses are further used to allow children to walk safely away from their parents or guardians, whilst remaining in contact with them.

The use of separate leads can be inconvenient, for example an animal's owner may misplace the lead and have to spend time looking for the lead before they can take their animal for a walk. Furthermore it is not always necessary for an animal to be kept on a lead when being exercised in the countryside, but when approaching a field with livestock or a road the owner may need to re-attach the lead, which may be awkward especially if the owner's hands are cold. Likewise, a parent or guardian may wish to allow a child to walk without holding their hand, but not want them to wander off on their own. This also requires the owner or parent or guardian to carry the lead when not attached to the animal or child, which may be particularly inconvenient if the owner or parent or guardian has two or more animals or children. It is not safe to leave the lead attached to the animal(s) or child or children in such instances as they may hinder the animal or child's movement and cause entanglement or even strangulation.

Collars and harnesses with integrated leads have therefore been designed to overcome these disadvantages. There are, however, further problems with such collar or harness and lead systems. Firstly, the mechanism by which the housing or casing for the retractable lead is attached to the collar or harness is often not sufficiently stable to hold the housing or casing in the required position on the collar or harness, which is particularly true when the housing or casing is removable. US2011/0036304, for example, discloses a collar with a removable casing that houses a retractable lead in which the collar is threaded through a loop on the lower face of the casing.

Secondly, the retractable lead is typically a cord in such devices, but such cords may not be strong enough for use with larger animals or children. US2011/0174238 is one example of such a device.

Furthermore, the design of the housing or casing within which the retractable lead is contained in prior art systems is often cumbersome and uncomfortable for the animal or child to wear.

A yet further disadvantage of current solutions is that the retractable leads are often shorter than desirable in order to minimize the size of the housing or casing required.

SUMMARY OF THE INVENTION

Accordingly, it would be desirable to provide an improved restraining device with a retractable lead which at least mitigates one or more of the aforementioned issues with current solutions.

It is a more specific, non-exclusive, object of the invention to provide an improved restraining device with a retractable lead that is contained within a housing or casing that is releasably attached to the required position on the restraining device. It is a further non-exclusive object of the invention to provide an improved restraining device with a retractable lead that is strong enough for use with larger animals or children.

In accordance with one aspect of the present invention there is provided a restraining device, e.g. for an animal or child, comprising a retractable strap, a housing or housing means, in which the retractable strap is at least partially housed; wherein the housing or housing means includes a twister or means for changing the orientation of the strap so that, in use, the orientation of the strap is changed as it is deployed from or retracted into the housing means.

A more specific aspect of the invention provides a restraining device with a retractable strap lead, the device comprising a restraint for attachment to an animal or child and a housing or casing in which the retractable strap lead is at least partially housed; wherein the housing or casing is attached to the restraint and includes a strap twister for changing the orientation of the strap lead so that, in use, the strap lead exits or is deployed from the housing or casing in an orientation that is substantially parallel to an adjacent portion of the collar strap.

The provision of a strap lead results in a stronger lead, while the twister prevents the strap edge injuring or causing discomfort to the animal or child.

The restraint may comprise a harness or a collar.

The strap twister preferably comprises a guide or channel that changes or modifies or alters the orientation of the strap lead. The strap twister may be connected or attached to the housing or casing and in some embodiments the strap twister is formed integrally with at least part of the housing or casing. The strap twister may comprise first and second opposed surfaces that define a twisting gap or a twisting guide or channel there between.

In other embodiments, the twister comprises only one twisting surface, for example against which the strap lead bears in use. It is further envisaged that the twister may comprise a series of guide wheels or bearings for changing or modifying or altering the orientation of the strap lead.

The housing or casing may be attached to the collar or harness strap by a cover that may be pinned to the housing or casing with the collar or harness strap sandwiched between the housing or casing and the cover. The attachment may be strengthened further using teeth on the collar- or harness-facing part of the cover that press into the collar. Additionally or alternatively, the housing or casing may be attached to the collar or harness strap by pins of the housing or casing that are received in loops of the collar or harness strap.

The housing or casing may further comprise an identification tag or module, which may be active or passive, for example a radio frequency identification tag or a subscriber identification module (SIM) and a battery, e.g. to enable the owner or parent or guardian to locate the animal or child such as by phoning the telephone number of the restraining device and listening for the ring tone.

A second aspect of the invention provides a restraining device with a retractable lead, the restraining device comprising a restraint for attachment to an animal or child and a housing or casing in which the retractable lead is at least partially housed; wherein the housing or casing is attached to the restraint by pins of the housing or casing that are received in loops or openings of the restraint, e.g. that may be woven into the material thereof.

This arrangement facilitates keeping the housing or casing in the required position on the restraining device The restraint may comprise a harness or a collar.

The retractable lead according to the second aspect of the invention may comprise a cord lead. However, the retractable lead preferably comprises a strap lead, which may include a strip of material or a tape. The strap or strip of tape may be wound around a cylinder that is within, for example at least partially or even wholly within, the housing or casing. The housing or casing may also comprise a biasing means or resilient biasing means or spring element, which may be configured to cause the strap lead to retract in use. The strap or strips of tape may be wound around a cylinder that may have an axis perpendicular to the collar strap or the housing or casing in order to minimize the profile of the housing or casing.

The housing or casing may comprise two or more parts, for example a mounting part and a cover, which cover may be in the form of a drum and/or may be substantially hollow. The mounting part may comprise or receive the pins. The pins may be releasably received within a portion or hole or aperture of the mounting part. At least a portion of the retractable lead may be received within the cover and/or between the cover and the mounting part.

The retractable lead may exit the housing or casing through a handle cover that is attached to the housing or casing and/or the collar. The handle cover may receive at least part, preferably most, of a handle attached to the end of the retractable lead, for example when the lead is fully retracted. The handle cover may have a strengthening element or loop by which it may be attached to the restraint in order to provide support to the handle when the lead is in use. The strengthening loop may be releasably attached to the restraint and/or may be connected at or adjacent to a free end of the handle cover.

The retractable lead may have a handle that may be releasably attached to the restraint or collar by means of poppers or magnetic fastenings or any other suitable attachment means.

The handle may be formed by a loop in the retractable lead and/or may include a grip means or tab. The handle may be formed by cutting the loop and reattaching the two ends of the retractable lead material with a grip means or tab or toggle, for example to help keep the handle flat to the collar when not in use and/or to help the owner or parent or guardian find the handle when it is required. The toggle may be made from an elastomeric polymer, for example rubber, or any other suitable material.

The retractable lead may pass through loops within or attached to the collar or harness.

Preferably, the housing or casing is shaped to fit comfortably to the child's back or the animal's neck or back. More preferably, the collar-facing side of the housing or casing may be concave, for example in order to fit comfortably to the child's back or the animal's neck or back.

According to a further optional feature of the invention, the restraint may have a reinforced hole for attachment of identity tags.

In accordance with a third aspect of the invention there is provided a restraining device, e.g. for an animal or child, with a retractable lead that is housed at least in part within a housing or casing that comprises a connector or attachment means for connecting an ancillary lead to the collar.

The restraining device may comprise the ancillary lead, which may comprise a second connector or attachment means, which may be configured to releasably connect or secure or engage with the connector or attachment means of the restraint. The ancillary lead may comprise a retractable lead and/or may comprise a cord, tape, strap or any suitable material.

In some embodiments, the retractable lead may be omitted from the housing or casing to which the ancillary lead is connected.

Preferably, the second connector or attachment means includes a hole in the upper surface of the housing or casing or cover and/or a lock or securing mechanism, for example that enables the ancillary lead to be held securely in place when in use and/or released, for example when no longer required.

In more preferred embodiments, the mechanism may comprise a pair of opposed hook elements that may be located or incorporated on the ends of plates, for example formed from sheet metal, which may be activated or released by one or more buttons located on the sides of the housing or casing.

In some embodiments, the attachment means may have a cap or lid to ensure that dirt or debris doesn't collect in the attachment hole.

In an alternative embodiment, the ancillary lead may be held securely to the outside of the housing or casing by a clamp or snap fitting or other suitable attachment means. The ancillary lead may also be attached or connected to the animal restraining device by a snap fitting or other suitable attachment means.

Preferably, the ancillary lead may comprise a handle and/or a lead and/or an attachment point. The ancillary lead may comprise a housing that may incorporate the handle and/or may house at least part of the lead, which may include a retraction mechanism, e.g. with any one or more of the elements or features described above in relation to the retractable lead of the restraining device. The handle may be ergonomically designed for the owner to hold. The handle may comprise a stop button that prevents extension or retraction of the lead. The handle may comprise a lock button for locking the stop button in a depressed position. In an alternative embodiment the handle may be formed by a loop in the lead.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
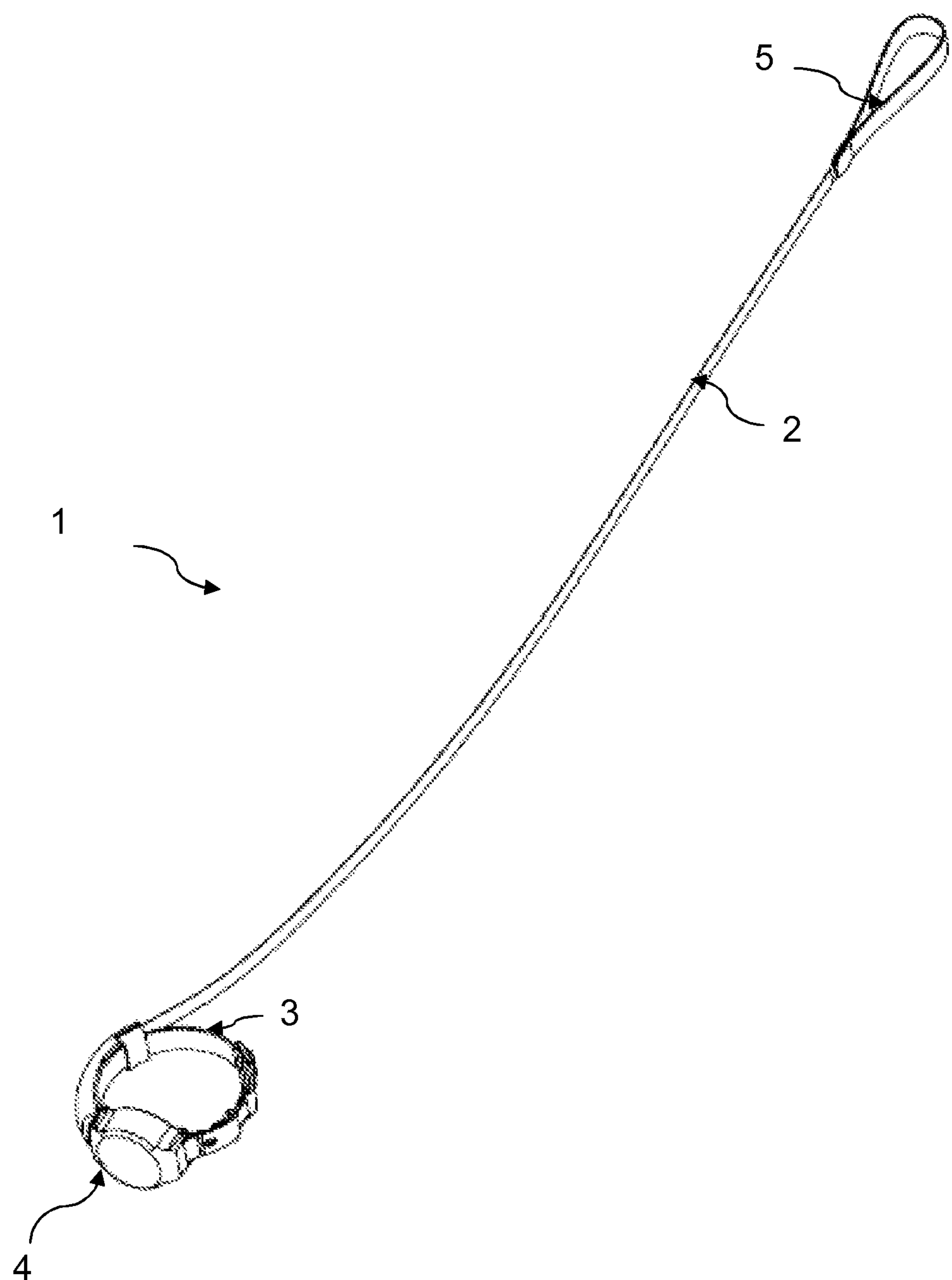
FIG. 1 is a perspective view of an animal collar with a retractable strap lead according to a first embodiment of the invention with the lead extended from the collar.
Figure 2:
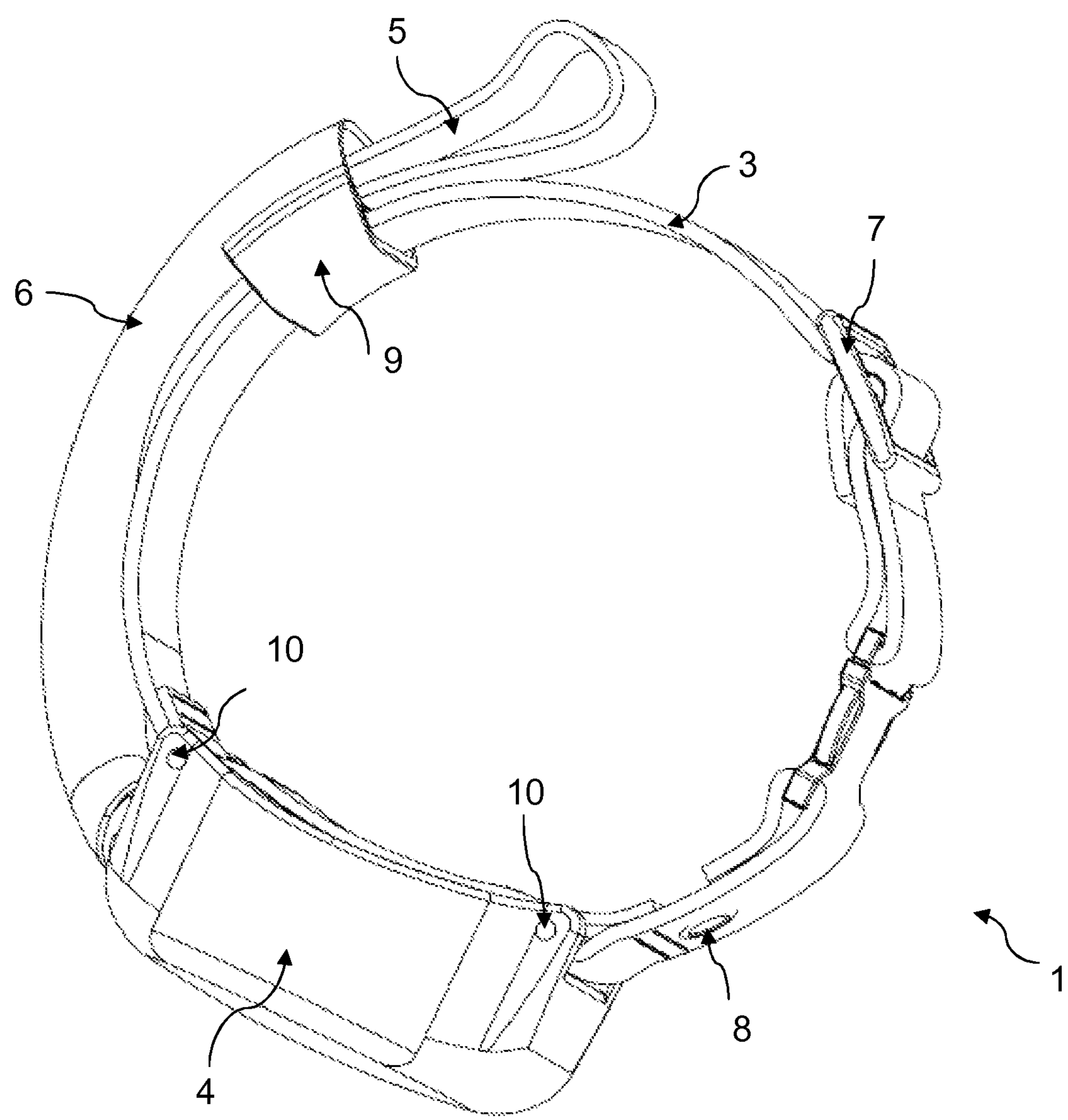
FIG. 2 is a view similar to that of FIG. 1 with the lead in a fully retracted condition.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

Referring to FIGS. 1 to 4, there is shown an animal collar 1 with a strap lead 2. The collar 1 comprises a collar strap 3 to be fitted around the animal's neck and a housing 4 in which the retractable strap lead 2 is housed. The strap lead 2 has a handle 5 by which the owner may hold the lead. The strap lead 2 and collar strap 3 are formed of a woven polyester fabric material in this embodiment, but it will be appreciated that they may be formed of any suitable material.

Figure 4:
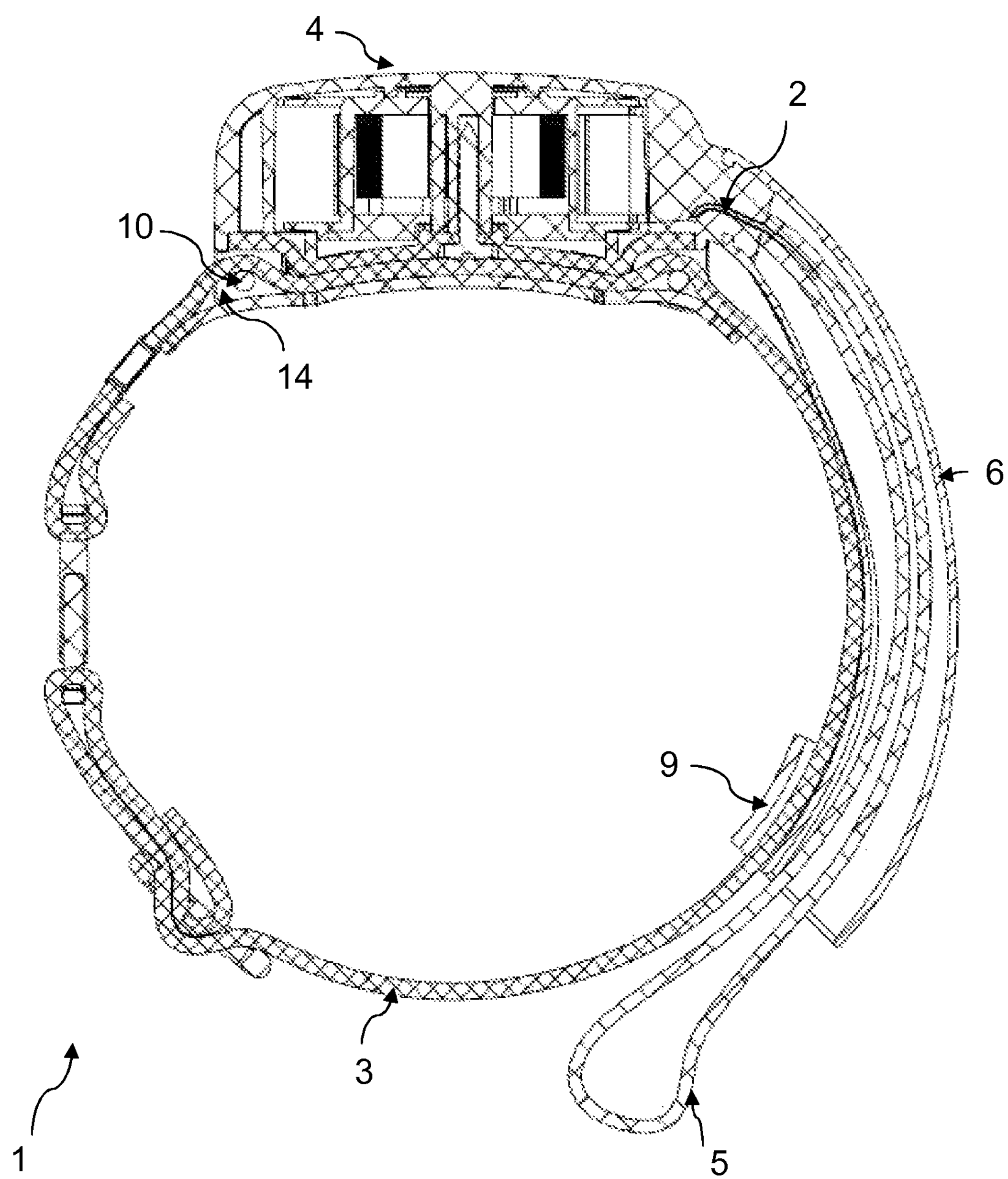
FIG. 4 is a section view through the animal collar of FIGS. 1 to 3.
Figure 5:
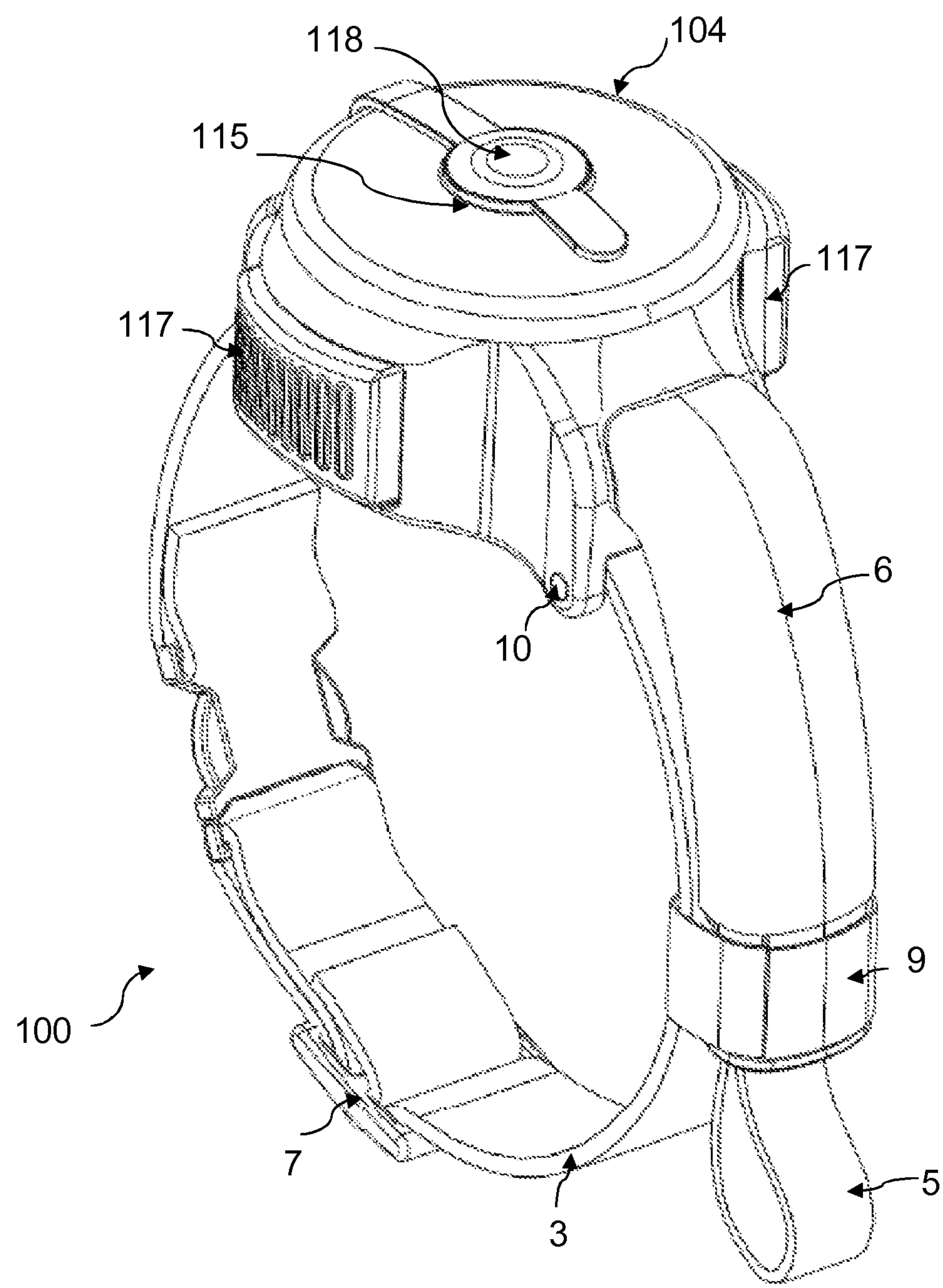
FIG. 5 is a perspective view of an animal collar with a retractable strap lead according to a second embodiment of the invention.

As shown more clearly in FIG. 4, the retractable lead (not shown) exits the housing 4 through a handle cover 6 attached to the housing 4 and the collar strap 3. The handle cover 6 is formed of an elastomeric material and receives most of the handle 5 when the lead is fully retracted. The handle cover 6 also has a strengthening element or loop 9 by which it is attached to the collar strap 3. The collar strap 3 is adjustable by means of a buckle 7, which may be replaced with any other suitable releasable fastening. The collar strap 3 also has a reinforced hole 8 for attachment of an identity tag (not shown). The housing 4 is attached to the collar strap 3 by pins 10 of the housing 4 and are received in loops 14 formed between layers of the collar strap 3. This is advantageous because the pins 10 will ensure the housing 4 is securely fastened to the collar strap 3; but still allow it to be removed if, for example, the owner wishes to wash the collar strap 3.

In use, the collar strap 3 is fitted around the animal's neck and when the lead 2 is not required by the owner, it is held within the housing 4 with the handle 5 being received in the handle cover 6. When the owner needs to hold the animal on the lead 2, they can remove the retractable strap lead 2 from the housing 4 by pulling the handle 5.

Figure 3:
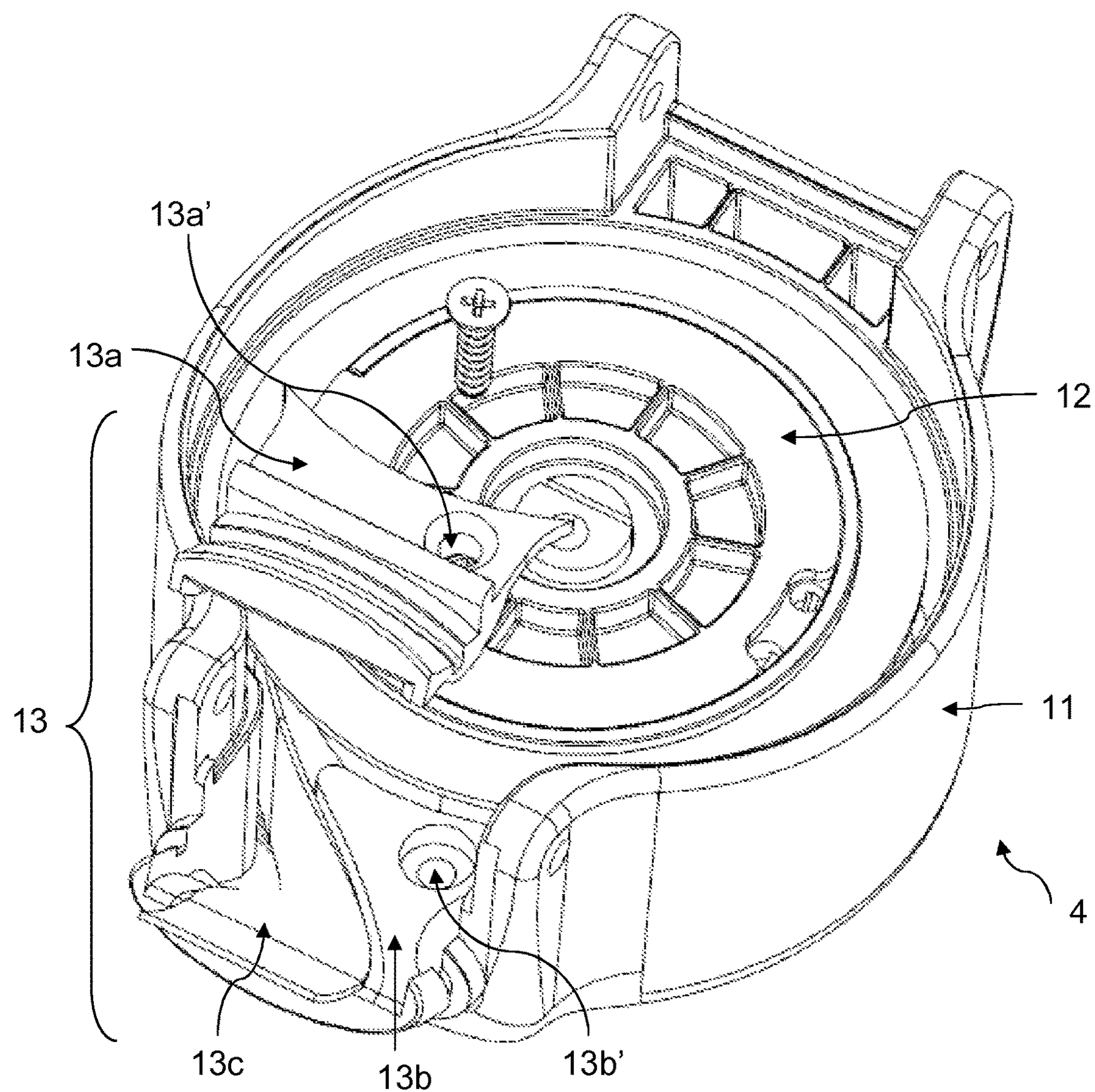
FIG. 3 is a schematic representation of the housing or casing of the animal collar of FIGS. 1 and 2.

Referring now to FIG. 3, the housing 4 has an outer casing 11, a cylinder 12 around which the strap lead 2 is wound and a strap twister 13 to change or modify the orientation of the strap lead 2 as it exits the housing 4. The strap twister 13 has two parts 13*a* and 13*b* that are attached to the housing 4 by a bolt (not shown) that extends through a respective hole 13*a*', 13*b*' and fit together to define a channel 13*c* through which the strap lead 2 is twisted as it exits the housing 4.

The strap lead 2 is wound around a cylinder 12 that is perpendicular to the flat surface of the housing 4 in order to minimize the profile of the housing 4. If the strap lead 2 were to be released from the housing 4 in this orientation there is a risk of the strap lead 2 cutting into the animal's skin. The strap twister 13 therefore changes the orientation of the strap lead 2 so that it, in use, the strap lead 2 exits the housing 4 in an orientation that is substantially parallel to an adjacent portion of the collar strap. Furthermore, the strap twister 13 may change the orientation of the strap lead 2 so that the strap lead 2 is oriented in a plane parallel to the adjacent portion of the collar strap as the strap lead 2 is deployed from the housing 4, as shown for example in FIGS. 1 and 2.

Referring now to FIGS. 5 to 8, there is shown an animal collar 100 according to a second embodiment of the invention that is similar to the collar 1 according to the first embodiment of the invention, wherein like references depict like features that will not be described further.

The collar 100 has a collar strap 3 to be fitted round the animal's neck and a housing 104 in which the retractable strap lead 2 is housed. The housing 104 has a second connector 115 for releasably connecting an ancillary lead 116 to the strap collar 3. The housing 104 has buttons 117 for activating and/or releasing the second connector 115. The housing 104 also has a cap 118 that fits over the second connector 115 in order to prevent dirt or debris collecting in the second connector 115.

Figure 7:
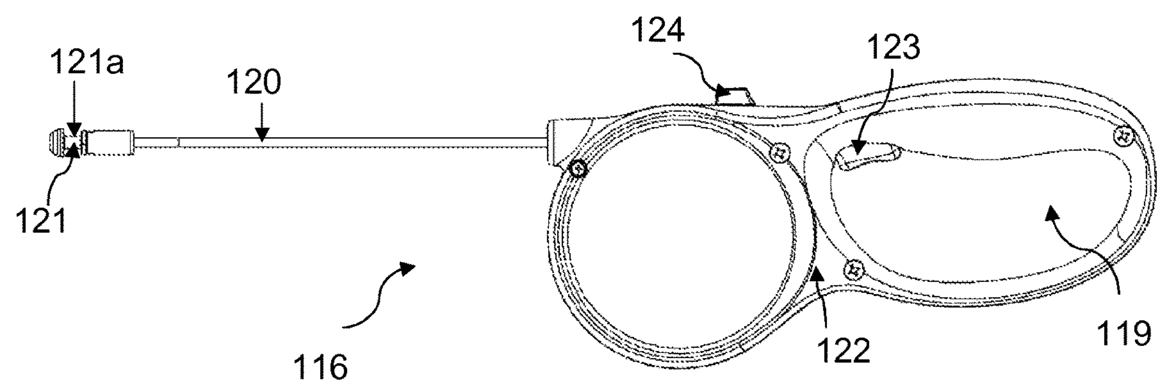
FIG. 7 is a side view of an ancillary lead for use with the animal collar of FIGS. 5 and 6.

As shown in FIG. 7, the ancillary retractable lead 116 has a similar internal construction to that of the respective strap lead of 2 and includes a handle 119, a lead 120 and an attachment point 121. The ancillary lead 116 has a housing 122 that forms the handle 119 and houses part of the lead 120. The ancillary lead 116 has a stop button 123 that prevents the extension or retraction of the lead 120 by braking the cylinder (not shown) to control the length of lead 120 that is released from the ancillary lead 116. The ancillary lead 116 also includes a lock button 124 for locking the stop button in a depressed position. The attachment point 121 is cylindrical with a circumferential recess adjacent to its end for cooperating with the attachment point 121.

Figure 6:
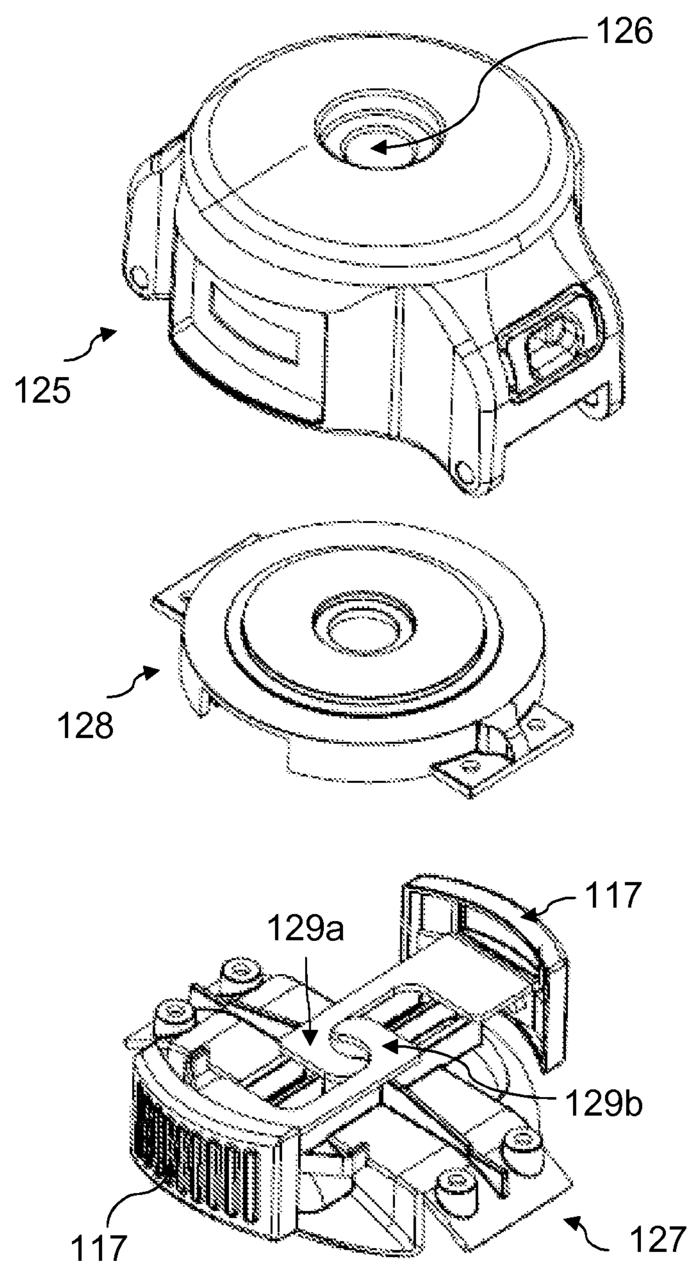
FIG. 6 is an exploded view of the housing or casing for use with the animal collar of FIG. 5.

As shown more clearly in FIG. 6, the housing 104 has an outer case 125 with a hole 126 in the upper surface in which the attachment point 121 of the ancillary lead 116 fits. The housing has a locking mechanism 127 that enables the ancillary lead 116 to be held securely in place when in use and released when no longer required. The locking mechanism 127 is made of a pair of opposed hook elements 129*a* and 129*b* that are incorporated into sheets which are activated by buttons 117 on the side of the housing 104. The hook elements 129*a*, 129*b* are biased toward a locked position by a spring element (not shown). The housing 104 also has a mechanism cover 128 that fits between the cylinder 12 around which the strap lead 2 is wound and the locking mechanism 127.

Figure 8:
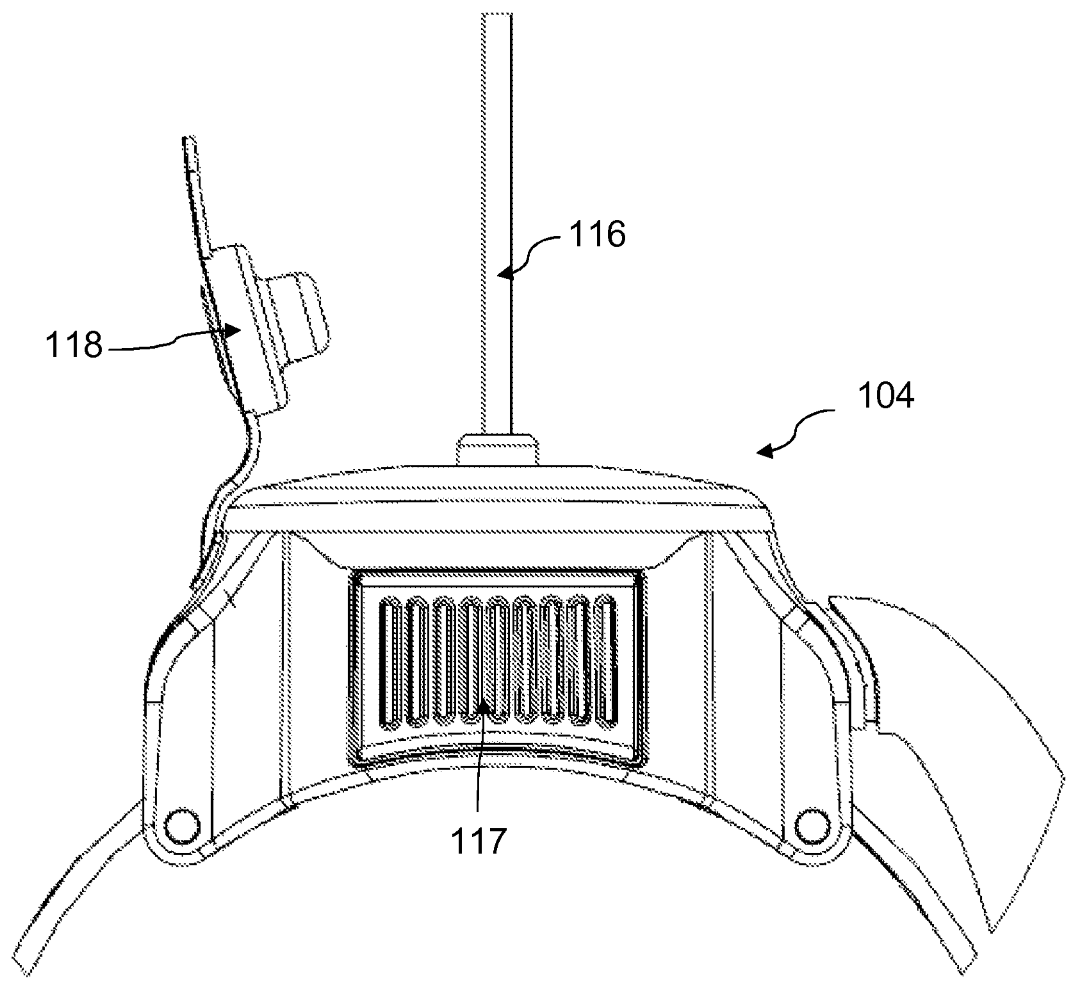
FIG. 8 is a side view of the housing or casing of the collar of FIGS. 5 and 6 with the ancillary lead attached.

As shown in FIG. 8, the ancillary lead 116 is connected to the housing 104 by opening the cap 118 and inserting the attachment point 121 of the ancillary lead 116 into the second connector 115.

When the ancillary lead 116 is not required, the collar 3 with retractable lead 2 will be used alone and the cap 118 fitted over the second connector 115. When the ancillary lead 116 is required, the cap 118 will be removed and the attachment point 121 of the ancillary lead 116 fitted into the second connector 115 on the housing 104. Button 123 is used to adjust the length of the ancillary lead 116. When the ancillary lead 116 is no longer required, buttons 117 may be used to release the attachment point 121 of the ancillary lead 116 from the housing 104.

Figure 9:
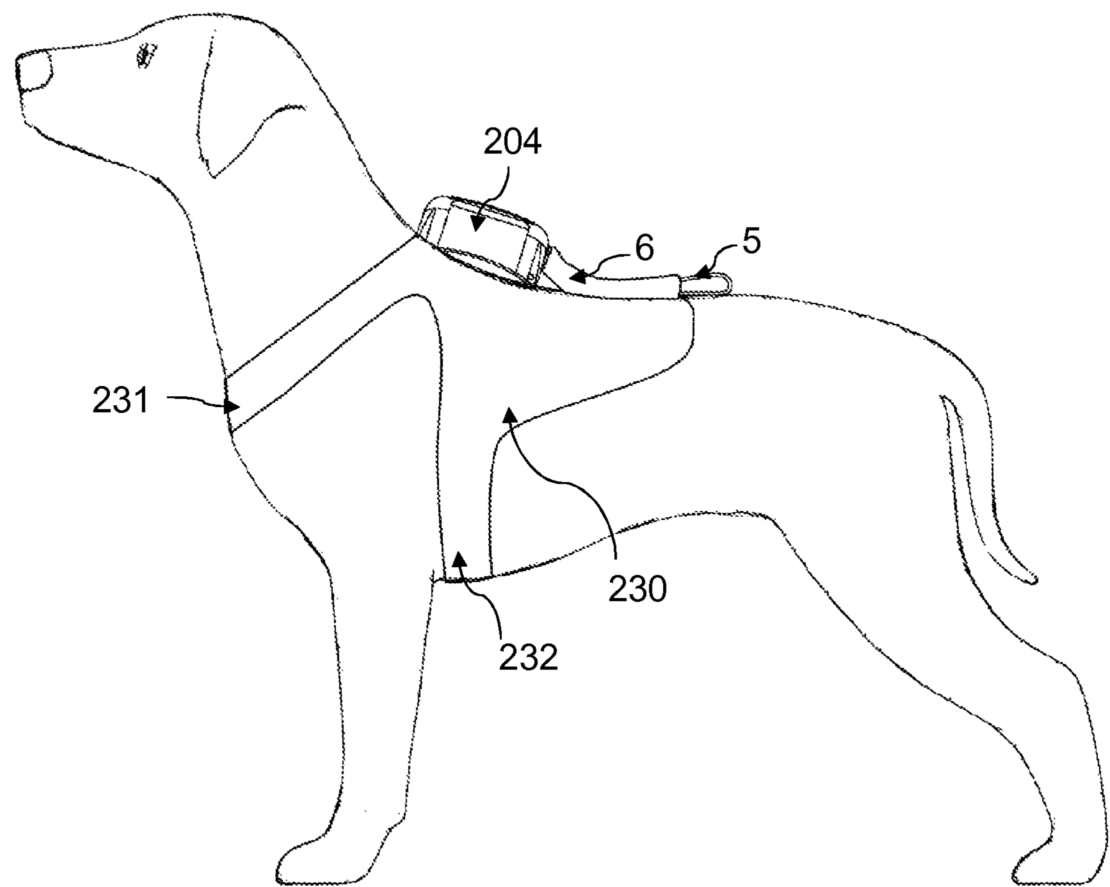
FIG. 9 is a side view of an animal wearing a harness to which a retractable lead is attached.

Referring now to FIG. 9 there is shown an animal wearing animal harness 230 according to a third embodiment of the invention that is similar to the collars 1, 100 according to the first two embodiments of the invention, wherein like references depict like features that will not be described further. The animal harness 230 has straps 231 and 232 which pass under the animal's legs and body. A housing 204 in which the retractable lead (not shown) is housed is connected to the harness on the animal's back.

The retractable lead (not shown) exits the housing 204 through a handle cover 6 attached to the housing 204. The handle cover 6 is formed of an elastomeric material and receives most of the handle 5 when the lead is fully retracted.

In use, the harness 230 is fitted around the animal's body and when the lead is not required by the owner, it is held within the housing 204 with the handle 5 being received in the handle cover 6. When the owner needs to hold the animal on the lead, they can remove the retractable strap lead from the housing 204 by pulling the handle 5.

Figure 10:
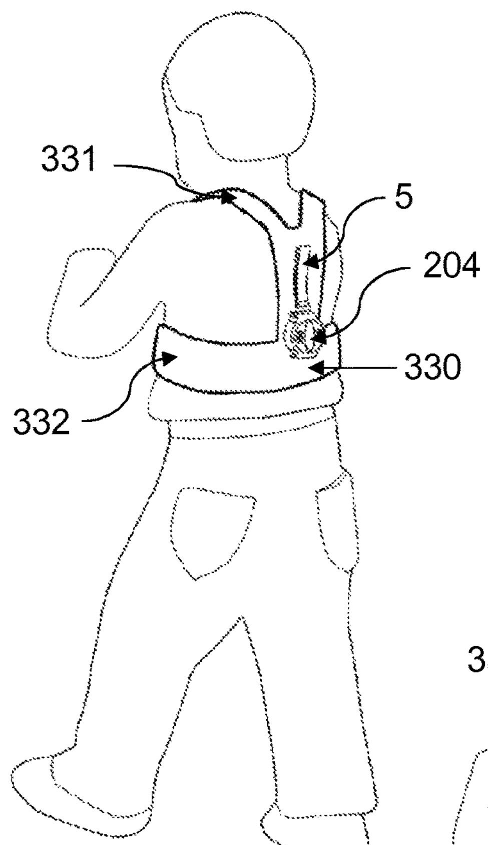
FIG. 10 is a rear view of a child wearing a harness to which a retractable lead is attached.
Figure 11:
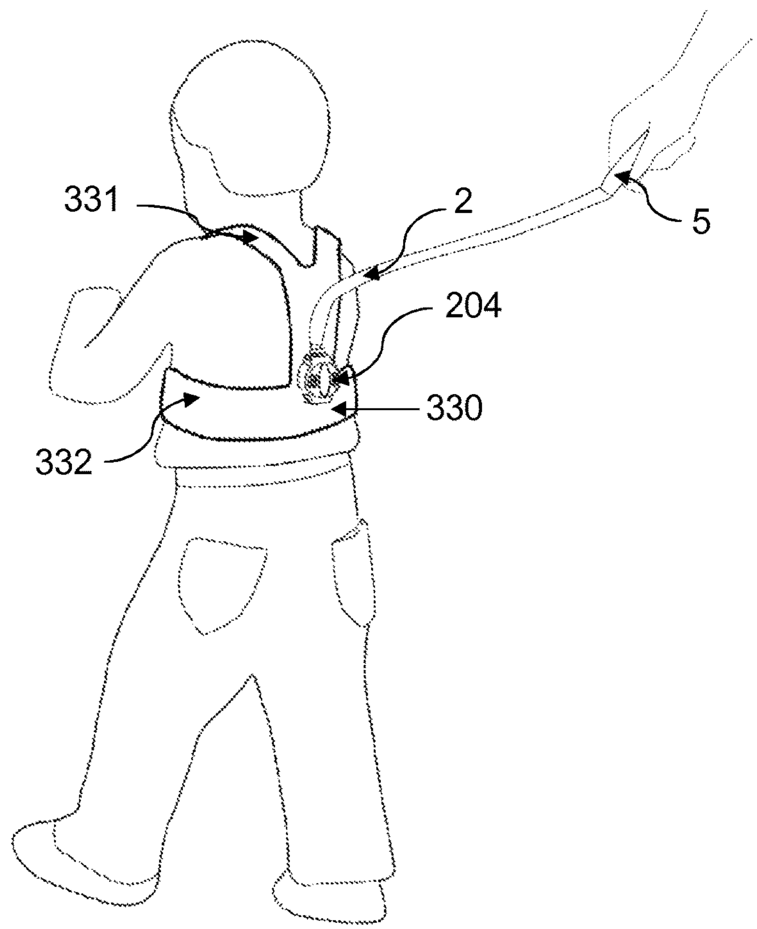
FIG. 11 is a view similar to that of FIG. 10 with the lead extended from the harness.

Referring now to FIGS. 10 and 11 there is shown a child wearing harness 330 according to a fourth embodiment of the invention similar to the harness 230 according to the third embodiment of the invention, wherein like references depict like features that will not be described further. The harness 330 has straps 331 and 332 which pass over the child's shoulders and around the child's waist, respectively. A housing 204 in which the retractable lead 2 is housed is connected to the harness on the child's back.

The retractable lead 2 exits the housing 204 and has a handle 5. The housing 204 receives most of the handle 5 when the lead 2 is fully retracted.

In use, the harness 330 is fitted around the child's body and when the lead 2 is not required by the parent or guardian, it is held within the housing 204 with the handle 5 being visible. When the parent or guardian needs to hold the child on the harness, they can remove the retractable strap lead 2 from the housing 204 by pulling the handle 5.

Figure 12:
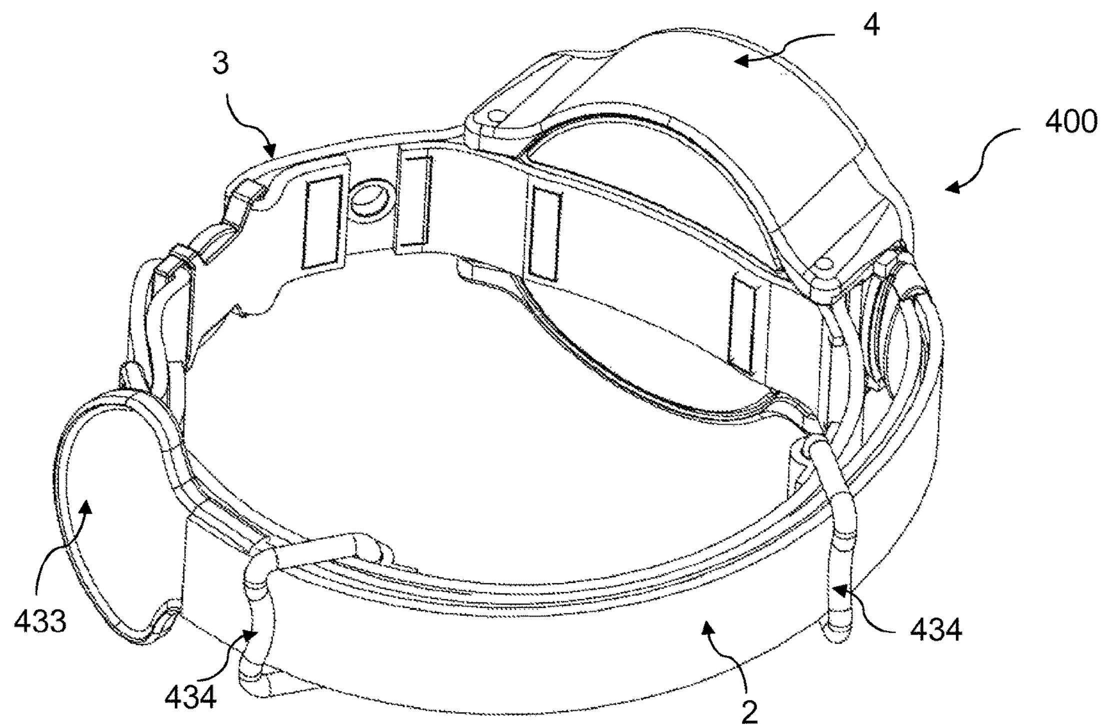
FIG. 12 is a perspective view of an animal collar with a retractable strap lead according to a fifth embodiment.
Figure 13:
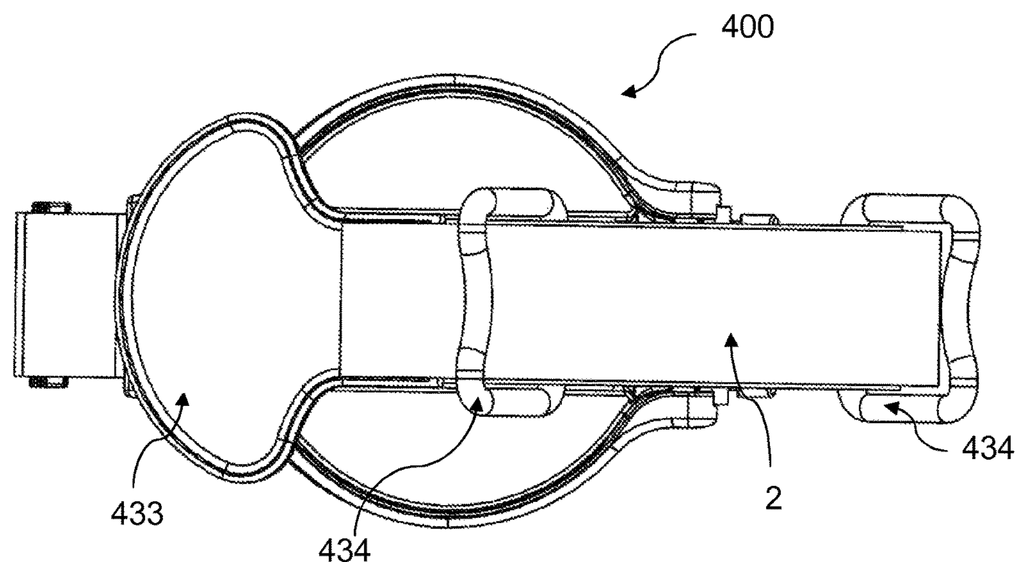
FIG. 13 is top view of the collar of FIG. 12.

Referring now to FIGS. 12 and 13, there is shown an animal collar 400 according to a fifth embodiment, that is similar to the collars 1, 100 according to the first two embodiments of the invention, wherein like references depict like features that will not be described further. The animal collar 400 differs from the other collars 1, 100 in that it includes a grip tab or toggle 433 and loops 434 through which the retractable strap lead 2 passes in order to keep the strap lead 2 flat to the collar 3 when the strap lead is not in use.

In use, the collar 400 is fitted around the animal's neck and when the lead is not in use, it is held within the housing 4; with the toggle 433 being held close to the collar 3 by the loops 434. When the owner needs to hold the animal on the lead, they can remove the retractable strap lead 2 from the housing 4 by pulling the toggle handle 433.

It will be appreciated by those skilled in the art that any number of combinations of the aforementioned features and/or those shown in the appended drawings provide clear advantages over the prior art and are therefore within the scope of the invention described herein.

The invention claimed is:

1. A restraining device comprising:

a restraint for attachment to an animal;

a retractable strap lead; and a housing comprising a twister for changing the orientation of the retractable strap lead as the retractable strap lead is deployed from the housing;

wherein the retractable strap lead is at least partially housed within the housing;

wherein the housing is attached to the restraint and the retractable strap lead is deployed from the housing in an orientation that is substantially parallel to an adjacent portion of the restraint; and wherein the twister comprises first and second opposed surfaces that define a twisting channel there between, and the retractable strap lead passes through the twisting channel such that as the retractable strap lead is pulled through the twisting channel, the orientation of the retractable strap lead is changed to orient the retractable strap lead in a plane parallel to the adjacent portion of the restraint as the retractable strap lead is deployed from the housing.

2. A restraining device according to claim 1, wherein the twister is formed integrally with at least part of the housing.

3. A restraining device according to claim 1, wherein the housing is attached to the restraint by pins of the housing that are received in loops in the restraint.

4. A restraining device according to claim 1, wherein the housing comprises a biasing means to cause the retractable strap lead to retract.

5. A restraining device according to claim 1, further comprising a handle cover attached to the housing and the restraint, wherein a strengthening loop attaches the handle cover to the restraint, wherein the retractable strap lead passes through the strengthening loop and handle cover as the retractable strap lead deploys from the housing.

6. A restraining device according to claim 1, further comprising a handle attached to one end of the retractable strap lead wherein the handle comprises a grip means.

7. A restraining device according to claim 1, wherein the housing comprises a connector for connecting an ancillary lead to the housing.

8. A restraining device according to claim 7, wherein the connector comprises a pair of opposed hook elements activated or released by a button on the side of the housing.

9. A restraining device according to claim 1, wherein the restraint comprises a collar.

10. A restraining device according to claim 1, wherein the restraint comprises a harness.

11. A restraining device according to claim 1, wherein a restraint facing side of the housing is concave.

12. A restraining device according to claim 5, wherein the handle cover is formed of an elastomeric material.

13. A restraining device according to claim 1, wherein the housing comprises an outer casing and a cylinder around which the retractable strap lead is wound, and wherein the cylinder is perpendicular to a surface of the housing held against the animal by the restraint.

14. A restraining device according to claim 1, wherein the twister comprises two parts which fit together to define the twisting channel.

15. A restraining device according to claim 1, wherein the strap lead bears in use against only one of the first and second opposed surfaces of the twister.

* * * * *